United States Patent [19]
Parriera

[11] Patent Number: 5,102,339
[45] Date of Patent: Apr. 7, 1992

[54] MATHEMATICAL EDUCATION GAME

[76] Inventor: Larry L. Parriera, 5889 Walnut, Chino, Calif. 91710

[21] Appl. No.: 594,445

[22] Filed: Oct. 5, 1990

[51] Int. Cl.⁵ .............................................. G09B 19/02
[52] U.S. Cl. .................................. 434/191; 273/272; 273/248
[58] Field of Search ............... 434/129, 128, 201, 202, 434/205, 197, 198, 188, 200, 191, 209; 273/302, 239, 242, 243, 248, 272, 283

[56] References Cited

U.S. PATENT DOCUMENTS

| | | | |
|---|---|---|---|
| 3,104,106 | 9/1963 | Kenney et al. | 434/191 X |
| 4,062,545 | 12/1977 | Witney | 273/246 X |
| 4,155,556 | 5/1979 | Falcione | 273/239 X |
| 4,316,612 | 2/1982 | Harder | 434/191 X |
| 4,360,347 | 11/1982 | Ghaznavi | 434/198 |
| 4,565,374 | 1/1986 | Pak | 273/272 |

FOREIGN PATENT DOCUMENTS 444285  6/1949  Italy ...................... 434/209

*Primary Examiner*—Richard J. Apley
*Assistant Examiner*—Karen A. Richard
*Attorney, Agent, or Firm*—Leon Gilden

[57] ABSTRACT

A game organization including a single game path defined by coextensive circuitous individual paths, with each individual path comprised of a series of spaces, with the spaces defined by a plurality of repetitive symbology. The repetitive symbology spaces each correspond to an associated category of cards, wherein the category of cards are each provided with a mathematical problem. Solving of the problems permits movement along each of the paths by associated tokens. A calculator member is provided to provide checking of calculations with a chance die member provided to effect movement of the tokens about the paths. Various obstacle spaces and mathematical solving cards associated with such obstacles are provided throughout the paths of the game.

6 Claims, 4 Drawing Sheets

MATHEMATICAL EDUCATION GAME

BACKGROUND OF THE INVENTION

1. Field of the Invention

The field of invention relates to game apparatus, and more particularly pertains to a new and improved method and apparatus for playing a mathematical education game as set forth by the instant invention providing operative association of a game of chance and ability to solve mathematical problems to effect a learning procedure relative to various players.

2. Description of the Prior Art

Mathematical number type games have been utilized in the prior art. Heretofore, however, such games have failed to provide the element of entertainment and chance with educational understanding in a manner as set forth by the instant invention. Examples of such games may be found in U.S. Pat. No. 4,360,347 to Ghazanavi wherein a mathematical game is provided in a concentric series of circles upon a game board, wherein the various pieces of the game are arranged to effect equation solving among participants.

U.S. Pat. No. 4,316,612 to Harder sets forth an educational game board accommodating a plurality of players, with color coded strips and markers provided with each marker having printed thereof a portion of an equation utilized by participants to solve various mathematical equations throughout the game.

U.S. Pat. No. 4,155,556 to Falcione sets forth a number game, including a plurality of tiles and top support means about an intersecting pattern of one row and one column to determine mathematical number combinations chosen by other players to fill the top support means to provide solutions of the various mathematical problems presented by the game.

U.S. Pat. No. 4,565,374 to Pak sets forth a mathematical board game defined by a rectangular grid matrix, with a plurality of tiles provided for each player for positioning upon the game board for various combustions of integers to present proper sequencing of the integers about the game board.

As such, it may be appreciated that there continues to be a need for a new and improved mathematical education game which addresses both the problems of ease of use as well as effectiveness in construction and in this respect, the present invention substantially fulfills this need.

SUMMARY OF THE INVENTION

In view of the foregoing disadvantages inherent in the known types of game apparatus now present in the prior art, the present invention provides a mathematical education game wherein the same incorporates elements of chance with mathematical problem solving in play of the game. As such, the general purpose of the present invention, which will be described subsequently in greater detail, is to provide a new and improved mathematical education game which has all the advantages of the prior art mathematical education games and none of the disadvantages.

To attain this, the present invention provides a game organization including a single game path defined by coextensive circuitous individual paths, with each individual path comprised of a series of spaces, with the spaces defined by a plurality of repetitive symbology. The repetitive symbology spaces each correspond to an associated category of cards, wherein the category of cards are each provided with a mathematical problem. Solving of the problems permits movement along each of the paths by associated tokens. A calculator member is provided to provide checking of calculations with a chance die member provided to effect movement of the tokens about the paths. Various obstacle spaces and mathematical solving cards associated with such obstacles are provided throughout the paths of the game.

My invention resides not in any one of these features pe se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essense of the technical disclosure of the application. The abstract is neither intended to define the invention of the application, which is measured by the claims, nor is it intended to be limiting as to the scope of the invention in any way.

It is therefore an object of the present invention to provide a new and improved mathematical education game which has all the advantages of the prior art mathematical education games and none of the disadvantages.

It is another object of the present invention to provide a new and improved mathematical education game which may be easily and efficiently manufactured and marketed.

It is a further object of the present invention to provide a new and improved mathematical education game which is of a durable and reliable construction.

An even further object of the present invention is to provide a new and improved mathematical education game which is susceptible of a low cost of manufacture with regard to both materials and labor, and which accordingly is then susceptible of low prices of sale to the consuming public, thereby making such mathematical education games economically available to the buying public.

Still yet another object of the present is to provide a new and improved mathematical education game which provides in the apparatuses and methods of the prior art some of the advantages thereof, while simultaneously overcoming some of the disadvantages normally associated therewith.

Still another object of the present invention is to provide a new and improved mathematical education game wherein the same provides mathematical directions throughout competings and conextensive circuitous paths defined about the game board in cooperation with similarly marked mathematical cords to solve various puzzles to permit proceeding along each of the circuitous paths.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
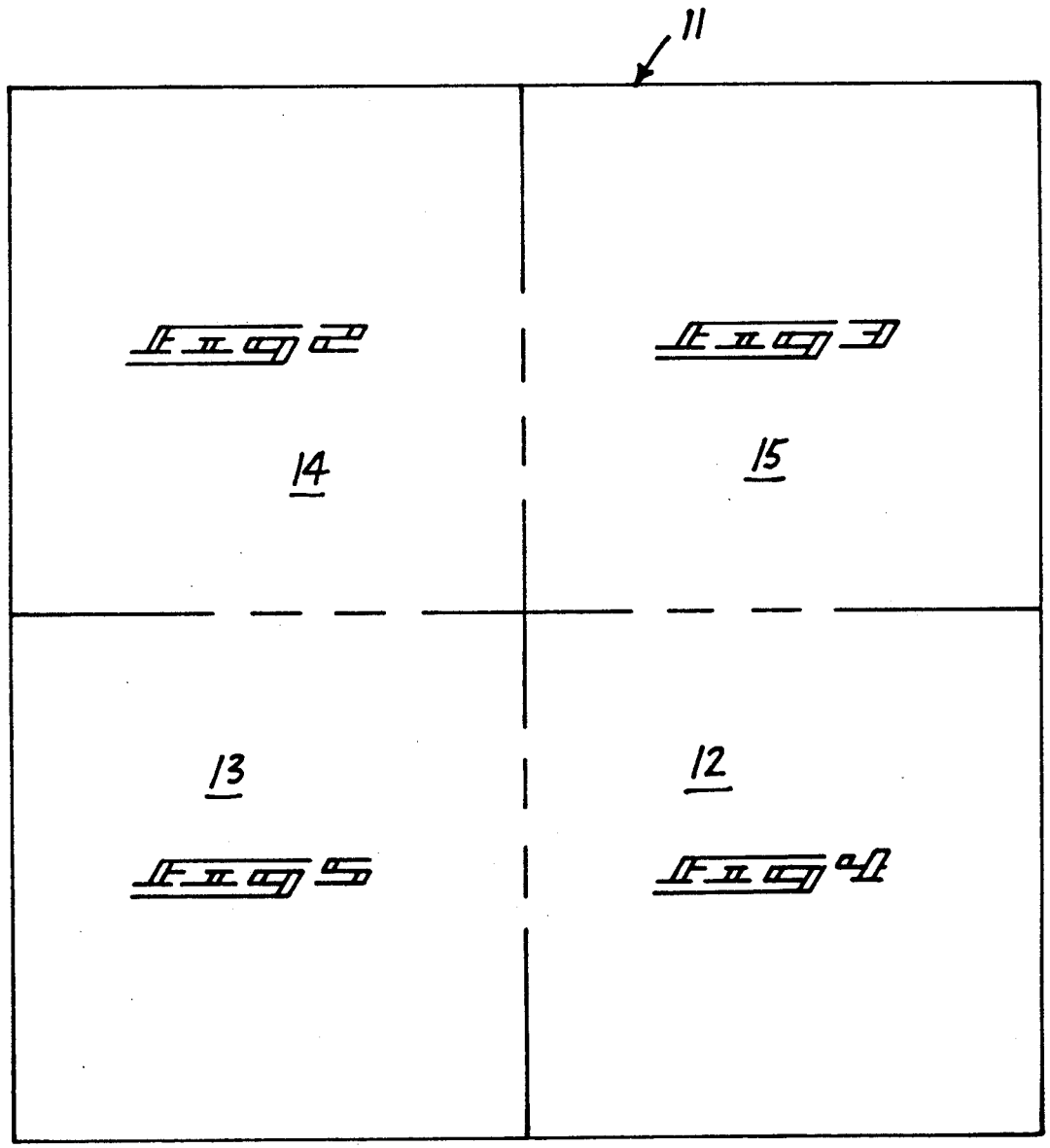
FIG. 1 is a diagrammatic illustration of the layout of the game board of the instant invention.

With reference now to the drawings, and in particular to FIGS. 1 to 7 thereof, a new and improved mathematical education game embodying the principles and concepts of the present invention and generally designated by the reference numerals 11 to 34 will be described.

Figure 4:
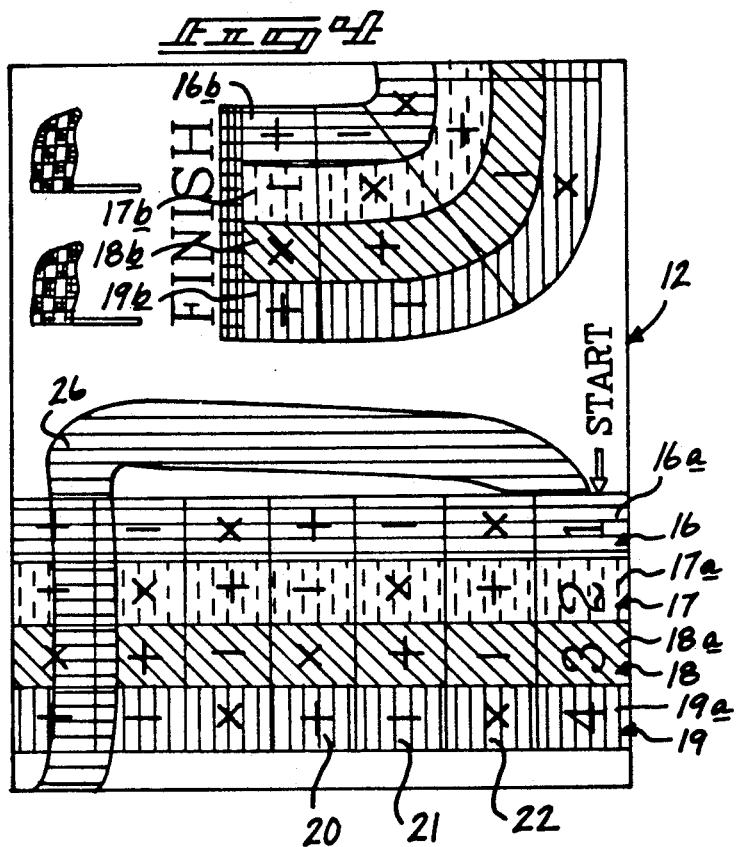
FIG. 4 is a top orthographic view of Section 4, as set forth in FIG. 1.
Figure 5:
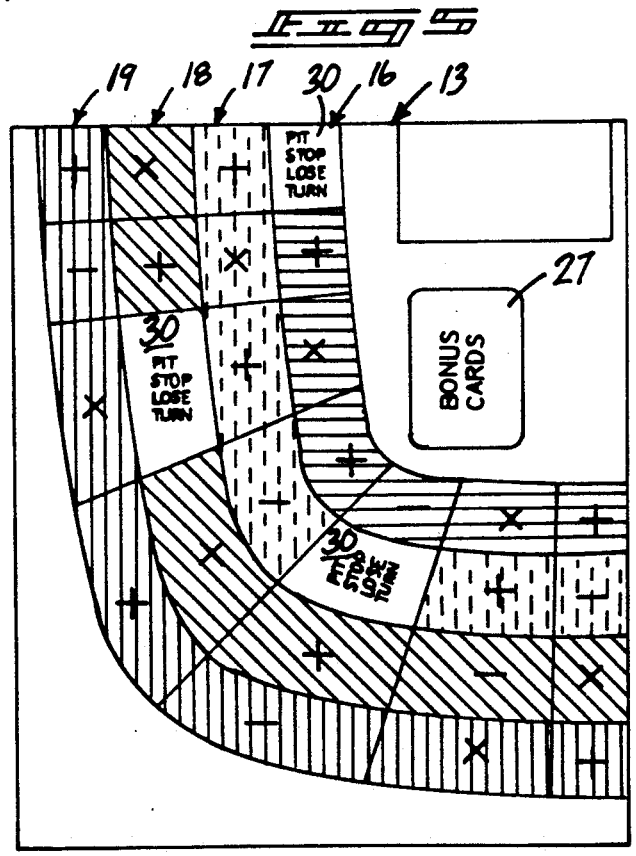
FIG. 5 is a top orthographic view of Section 5, as set forth in FIG. 1.
Figure 6:
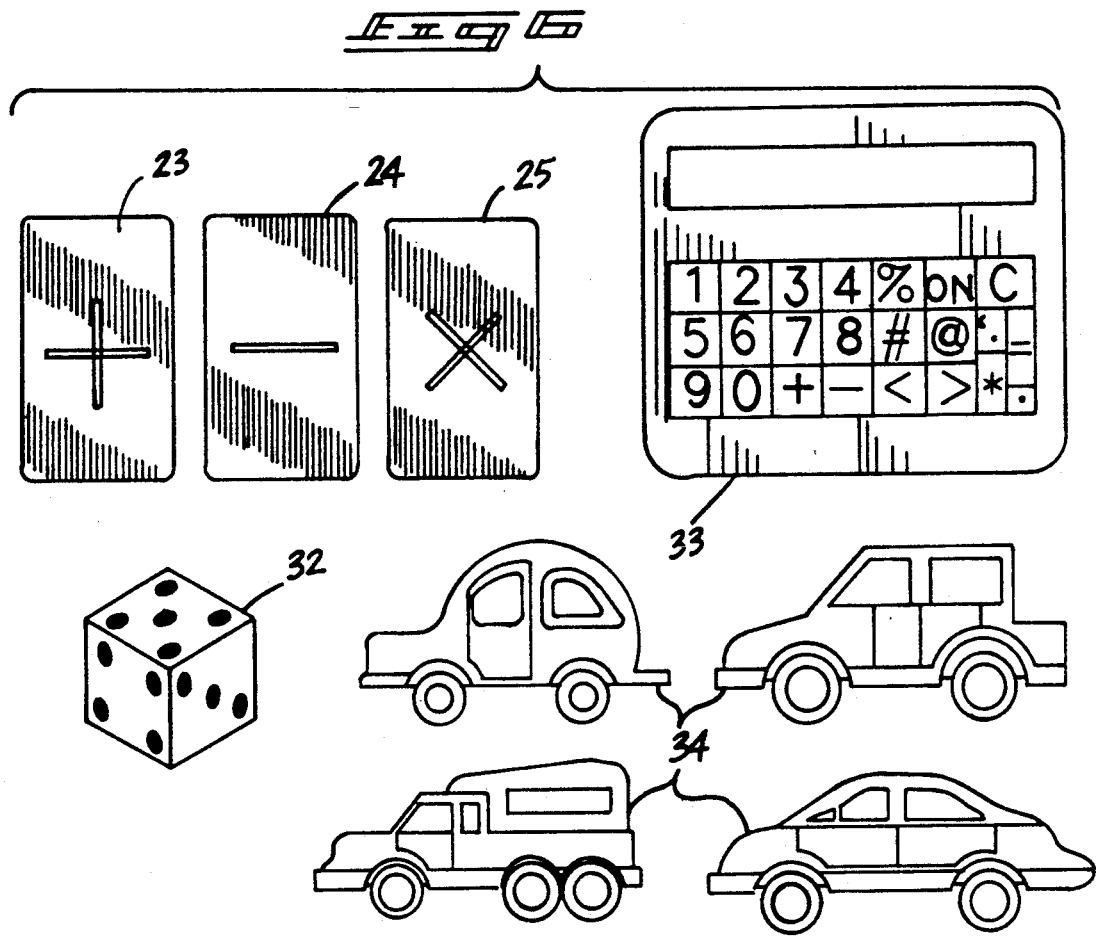
FIG. 6 is an orthographic illustration of the various components utilized by the instant invention.
Figure 7:
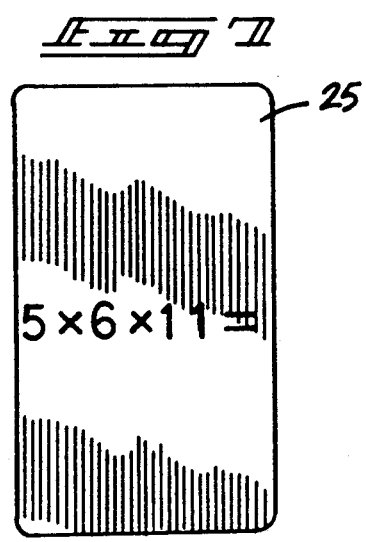
FIG. 7 is a top orthographic illustration of a typical mathematical puzzle set forth by the category cards of the instant invention.

More specifically, the mathematical education game of the instant invention essentially comprises a playing board 11 defined by a respective first section 12, a second section 13, a third section 14, and a fourth section 15 set forth in FIGS. 2 through 5 respectively, defining a single circuitous game path. The single game path is defined by a respective first, second, third, and fourth separate circuitrous path 16, 17, 18, and 19 respectively, each coextensive and contiguous relative to one another, including a respective first, second, third, and fourth starting space 16a, 17a, 18a, and 19a, as illustrated in FIG. 4, terminating in respective first, second, third, and fourth terminal spaces 16b, 17b, 18b, and 19b respectively, indicating a finish line adjacent thereto, whereupon a player leaving a terminal space may be declared a winner. Each of the individual circuitous paths 16-19 include a series of coextensive and separate spaces defined by a respective first, second, and third category of sapces 20, 21, and 22 randomly dispersed and repeating throughout the separate paths 16-19. Each of the category of spaces 20, 21, and 22 are defined by symbology associated with a respective first, second, and third mathematical category of cards 23, 24, and 25 respectively associated with the respective first, second, and third category of spaces 20-22. A player landing upon a respective category of space 20-22 is directed to select a corresponding card of the category of cards 23-25. FIG. 7 illustrates a typical example of a third category of mathematical card defined by a multiplication symbol upon a rear surface thereof and by a multiplication problem on a forward surface thereof, as illustrated in FIGS. 6 and 7 for example. A player landing upon one of the respective first through third category of spaces °-22 and selecting an associated category of cards 23-25 is provided with a first time period to solve the problem, typically sixty seconds, thereafter that player's turn is forfeited. Throughout the typical game path defined by the separate circuitous paths 16-19 are various obstacles. Specifically, a first obstacle 26 defined as a single band of a plurality of spaces projecting orthogonally across the separate circuitous paths of the single game path is illustrated as a river, whereupon a player landing upon the first obstacle of spaces 26 is directed to return to one of the respective starting spaces 16a-19a of the respective separate circuitous paths 16-19.

Figure 2:
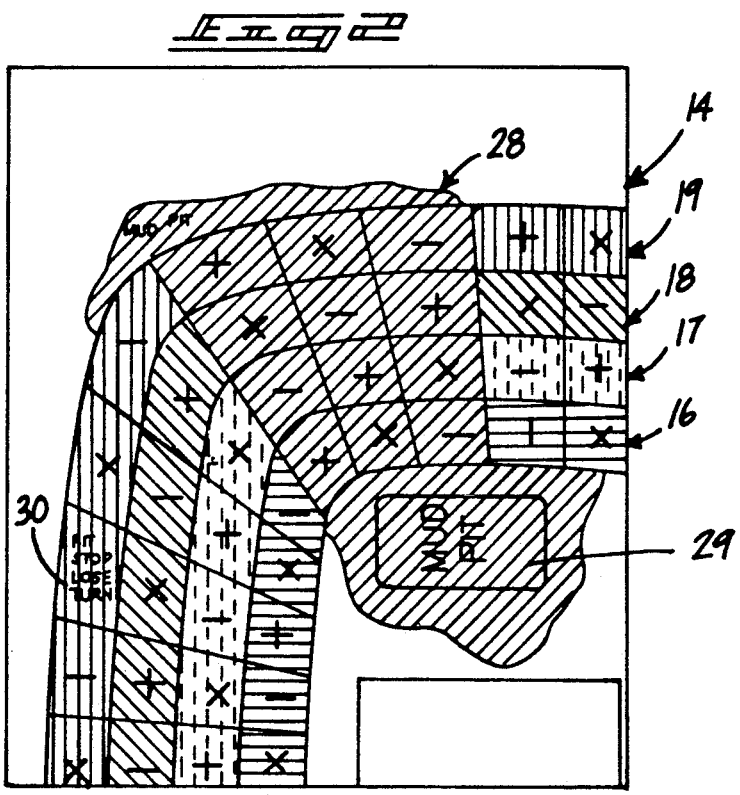
FIG. 2 is a top orthographic illustration of section 2, as set forth in FIG. 1.
Figure 3:
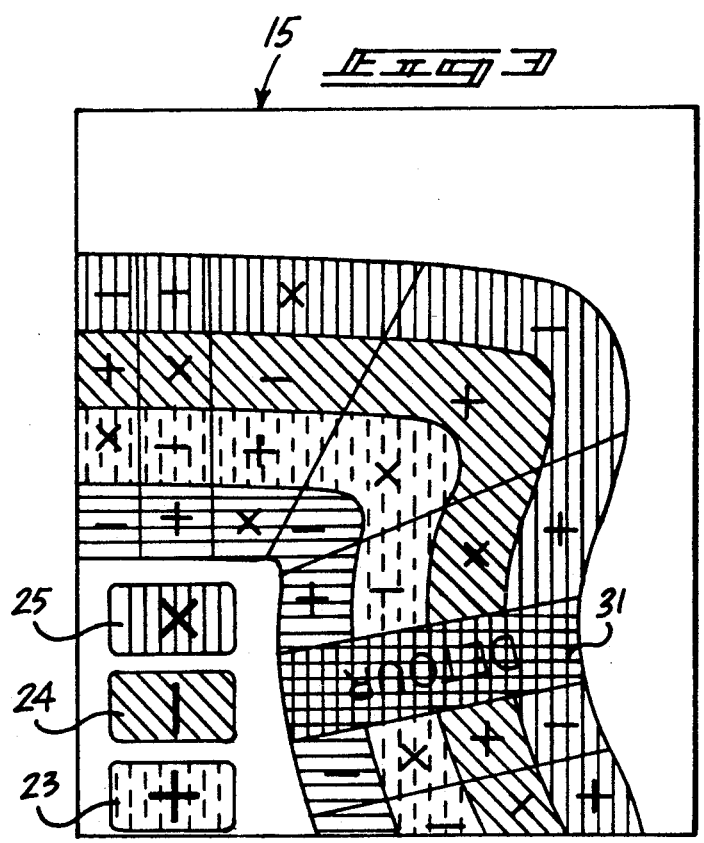
FIG. 3 is an orthographic view of Section 3, as set forth in FIG. 1.

A second obstacle of spaces 28 is defined as a single band of a plurality of spaces defined as a section and illustrated in FIG. 2 as a "mud pit". Upon a player landing in the second obstacle of spaces 28 is directed to select a card from a deck of second obstacle cards 29, including a random selection of the plurality of mathematical categories, whereupon a player is then provided with a second time period (typically thirty seconds) less than that of the first time period to solve the problem or else forfeit that turn. A third obstacle of spaces are defined as "loose a turn" spaces randomly positioned within each separate circuitous path of the circuitous paths 16-19. A fourth obstacle category of spaces 31 is defined by a single band of spaces (see FIG. 3) set forth as a "detour", wherein the fourth obstacle of spaces maintains a player must roll the die utilized in the game 32 and move backwards that number of spaces along that respective separate circuitous path that player is proceeding along. The chance die markers utilized determines a procession of each player along each separate circuitous path. Further, upon a player correctly solving a problem, that player may optionally select a card from the bonus card deck 27 that includes a random selection of mathematical problems from the plurality of mathematical problems defined within the first through third mathematical category of cards 23-25. If that player answers correctly, he may proceed forwardly determined by a roll of the dice member 32, but if answering incorrectly, that player must retreat rearwardly towards the respective starting space that indicated number defined by the die member 32 subsequent to the roll of the die member. A calculator 33 is provided for checking correctness of each mathematical response relative to each mathematical problem directed by the category of cards 23, 24, 25, 27, and 29. Separate tokens 34 are provided with a token afforded each player and a predetermined number of tokens defined for each predetermined circuitous path for each player to indicate positioning of a token relative to each path.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as being new and desired to be protected by Letters Patent of the United States is as follows:

1. A mathematical education game comprising, in combination,
    a playing board, the playing board including a single circuitous game path, the single circuitous game path including a plurality of separate circuitous game paths, and each of the separate circuitous game paths includes a predetermined number of category spaces randomly and repeatingly dispersed throughout each of the separate circuitous paths, and each space of the category of spaces associated with a plurality of mathematical card decks, each deck of the mathematical plurality of card decks associated with a separate category of a plurality of category of spaces, and
    a token provided for movement along each path of the plurality of separate circuitous paths, and
    a chance member to randomly generate a number for movement of each token along each separate circuitous path, and
    wherein each of the mathematical category of card decks includes separate cards, with a player provided a first time period for solving a mathematical problem presented by each card of the category of card decks, and
    including a bonus card deck, whereupon correct solving of a card of the mathematical category of card decks provides a bonus card optionally selected for solving, wherein the bonus card deck includes a plurality of bonus cards, whereupon correct resolution of a bonus cards, whereupon correct resolution of a bonus card permits forward advance of an associated player token with incorrect solving of a bonus card deck directing rearward retreat of a bonus card token along a respective path of the separate circuitous paths.

2. A game as set forth in claim 1 wherein a first single band of spaces orthorgonally directed to cross the single game path directs return of a token to a starting space, with each separate circuitous path including a starting space as an origination space of each separate circuitous path.

3. A game as set forth in claim 2 including a second obstacle band of spaces, wherein the second obstacle band of spaces are associated with a second obstacle deck of cards, wherein the second obstacle deck of cards includes a plurality of mathematical problems, with a second time period less than the first time period provided for solving a problem from the cards of the second obstacle cards, 4. A game as set forth in claim 3 including third obstacle spaces randomly directed and positioned within each separate circuitous path.

5. A game as set forth in claim 3 including a fourth single band of obstacle spaces, wherein each of the fourth obstacle of spaces includes directions to direct a player to retreat rearwardly along a respective circuitous path a random number generated by the chance generating member.

6. A game as set forth in claim 5 including a calculator to permit generating a proper response to each mathematical problem directed by the respective plurality of mathematical category card decks, the bonus card deck, and the second obstacle cards.

* * * * *